Jan. 28, 1958 J. W. SCHELL 2,821,013

METAL COATING AND METHOD OF MAKING THE SAME

Filed Dec. 16, 1954

John W Schell
*INVENTOR.*

*BY* Ralph Hammar
Attorney

United States Patent Office 2,821,013

Patented Jan. 28, 1958

2,821,013

METAL COATING AND METHOD OF MAKING THE SAME

John W. Schell, Erie, Pa., assignor to Erie Resistor Corporation, Erie, Pa., a corporation of Pennsylvania Application December 16, 1954, Serial No. 475,783

4 Claims. (Cl. 29—195)

In ceramic capacitors, it is desirable that the metal coatings forming the condenser electrodes be intimately bonded to the ceramic so that advantage can be taken of the full dielectric constant of the ceramic without any loss in the effective dielectric constant due to air intervening between the metal coating and the ceramic. It is further desirable that the metal electrode coatings be copper because that is readily adaptable to the soldering operations needed in the connection of the condenser into electric circuits. This invention is intended to provide such a copper electrode coating which will have the high conductivity characteristic of pure copper and will be intimately bonded to the ceramic.

The copper electrode coating is made up of three layers, an inner layer of gas plated nickel of flash thickness applied directly to the ceramic, an intermediate layer of nickel electroplated to the first layer and likewise of flash thickness, and an outer coating of electroplated copper much thicker than the flash coatings of nickel and having the necessary thickness to provide the conductivity necessary for condenser electrodes.

The initial layer of gas plated nickel provides the adherence to the ceramic. This adherence is not present when thick layers of nickel are deposited by gas plating but is only present when the layer has only sufficient thickness to cover the ceramic surface. Such coatings are known in the art as flash coatings and are too thin to be measured by any of the methods available for measuring the thickness of electroplated coatings of commercial thickness. The intermediate layer of electroplated nickel which is likewise of flash thickness adheres readily to the first layer of gas plated nickel and provides a surface which can be electroplated with copper to provide the finished coating. The initial layer of gas plated nickel cannot be electroplated with copper. The composite coating has the electrical conductivity of pure copper and because of the extreme thinness of the two flash coatings of nickel, has the properties of a copper coating bonded into intimate contact with the ceramic surface without any intervening air.

Figure 1:
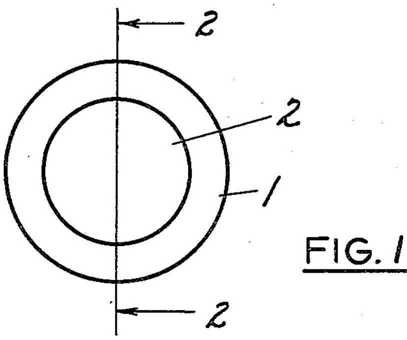
Figure 2:
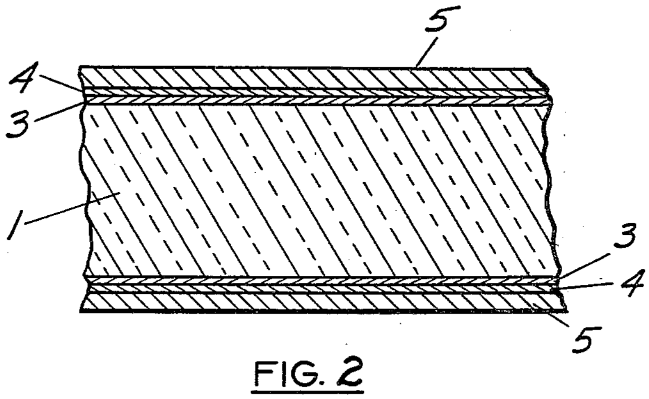

In the accompanying drawing, Fig. 1 is a top view of a ceramic condenser and Fig. 2 is a fragmentary section on line 2—2 of Fig. 2 enlarged to show the electrode coating on the ceramic.

In the drawing, 1 indicates the ceramic dielectric and 2 indicates the electrode coatings on opposite faces of the ceramic. The capacity of the condenser is proportional to the area of the electrode and the dielectric constant of the ceramic and is inversely proportional to the thickness of the ceramic. Since the ceramic may have a dielectric constant running up into the thousands, it is important that the electrodes 2 be applied in intimate contact with the ceramic so that the full advantage can be taken of the dielectric constant.

As shown in the enlarged fragmentary sectional view, Fig. 2, the electrode coatings 2 are made up of three layers, an inner layer 3 of nickel gas plated into intimate contact with the dielectric 1, an intermediate layer 4 of nickel electroplated to the layer 3, and an outer layer 5 of copper electroplated to the layer 4.

The gas plated nickel layer 3 is of flash thickness and is deposited by pyrolytic decomposition of nickel carbonyl by the usual process. This layer 3 is very brittle but has excellent adherence to the ceramic dielectric. Copper cannot be electroplated directly to the gas plated nickel coating 3 without destroying the adherence. However, it is possible to put a flash coating 4 of electroplated nickel directly over the gas plated nickel coating 3 without destroying the adherence. The electroplated nickel coating 4 has sufficient ductility so that it provides a suitable surface for the outer coating 5 of electroplated copper. During the application of the copper electroplated coating 5, the electroplated nickel coating 4 prevents the loss of adherence to the ceramic which would otherwise take place. The electroplated coating 5 of copper has substantial thickness so that it has adequate conductivity to serve as a condenser electrode. The coatings 3 and 4 which are very much thinner than the copper coating 5 do not have sufficient thickness to affect the properties of the copper coating 5 so that the copper coating 5 behaves as though it were actually in physical contact with surface of the ceramic 1. This is true because of the extreme thinness of the coatings 3 and 4 as well as the fact that the coatings 3 and 4 are both metallic conducting coatings.

The electroplating processes for the flash nickel coating 4 and the thicker outer coating 5 of copper are not critical. Any suitable commercial processes may be used.

By the expedient of the electroplating of a flash of nickel over the gas plated flash coating 3, a surface is made which readily receives the outer electroplated copper coating 5 and at the same time does not destroy the intimate adherence or bonding of the coating 3 to the ceramic surface.

What is claimed as new is:

1. A ceramic dielectric having a coating comprising a coating of flash thickness of nickel gas plated from nickel carbonyl directly in contact with the ceramic, a coating of flash thickness of electroplated nickel on and in direct contact with the gas plated coating, and an electroplated copper coating on and in direct contact with and of substantially greater thickness than the electroplated nickel coating.

2. The method of applying conductive copper coatings to ceramics which comprises initially applying in direct contact with the ceramic a flash coating of gas plated nickel from pyrolytic decomposition of nickel carbonyl, applying a flash coating of electroplated nickel over and in direct contact with the gas plated nickel coating, and applying an electroplated copper coating over and in direct contact with the electroplated nickel coating of thickness substantially greater than the thickness of the flash coatings.

3. The method of applying conductive solderable metal coatings to ceramics which comprises initially applying in direct contact with the ceramic a flash coating of gas plated nickel from pyrolytic decomposition of nickel carbonyl, applying a flash coating of electroplated nickel over and in direct contact with the gas plated nickel coating, and applying an electroplated solderable metal coating other than nickel over and in direct contact with the electroplated nickel coating of thickness substantially greater than the thickness of the flash coatings.

4. A ceramic dielectric having a coating comprising a coating of flash thickness of nickel gas plated directly in contact with the ceramic, a coating of flash thickness of electroplated nickel on and in direct contact with the gas plated coating, and an electroplated copper coating on and in direct contact with and of substantially greater thickness than the electroplated nickel coating.

References Cited in the file of this patent

UNITED STATES PATENTS

| | | |
|---|---|---|
| 1,977,639 | Langdon | Oct. 23, 1934 |
| 2,304,182 | Lang | Dec. 8, 1942 |
| 2,424,583 | Rahm | July 29, 1947 |

FOREIGN PATENTS

| | | |
|---|---|---|
| 361,964 | Great Britain | Nov. 30, 1931 |